United States Patent
Negulescu et al.

(10) Patent No.: US 8,834,108 B2
(45) Date of Patent: Sep. 16, 2014

(54) RUNNING-GAP CONTROL SYSTEM OF AN AIRCRAFT GAS TURBINE

(75) Inventors: Dimitrie Negulescu, Berlin (DE); Stephan Lisiewicz, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 512 days.

(21) Appl. No.: 12/711,903

(22) Filed: Feb. 24, 2010

(65) Prior Publication Data

US 2010/0215481 A1   Aug. 26, 2010

(30) Foreign Application Priority Data

Feb. 26, 2009 (DE) .......................... 10 2009 010 647

(51) Int. Cl.
*F01D 11/24* (2006.01)
*F02K 3/06* (2006.01)
*B64D 33/02* (2006.01)

(52) U.S. Cl.
CPC .......... *F01D 11/24* (2013.01); *F05D 2260/205* (2013.01); *Y02T 50/676* (2013.01); *B64D 2033/024* (2013.01); *F02K 3/06* (2013.01); *Y02T 50/671* (2013.01)
USPC ............................ 415/175; 415/145; 415/178

(58) Field of Classification Search
USPC ......... 415/145, 108, 144, 175, 176, 177, 178, 415/180
See application file for complete search history.

(56) References Cited

U.S. PATENT DOCUMENTS

| | | | |
|---|---|---|---|
| 4,163,366 A | 8/1979 | Kent | |
| 4,841,726 A | 6/1989 | Burkhardt | |
| 4,849,895 A * | 7/1989 | Kervistin | 701/100 |
| 5,116,199 A * | 5/1992 | Ciokajlo | 415/173.2 |
| 5,540,547 A * | 7/1996 | Cole | 415/177 |
| 6,035,929 A | 3/2000 | Friedel et al. | |
| 6,487,491 B1 | 11/2002 | Karpman et al. | |
| 6,625,989 B2 * | 9/2003 | Boeck | 60/782 |
| 7,360,989 B2 | 4/2008 | Amiot et al. | |
| 7,717,667 B2 | 5/2010 | Urbassik et al. | |

(Continued)

FOREIGN PATENT DOCUMENTS

| DE | 3309812 | 9/1984 |
|---|---|---|
| DE | 3437076 | 4/1986 |

(Continued)

OTHER PUBLICATIONS

German Search Report dated Mar. 9, 2010 in corresponding German patent application.

(Continued)

*Primary Examiner* — Edward Look
*Assistant Examiner* — Juan G Flores
(74) *Attorney, Agent, or Firm* — Timothy J. Klima; Shuttleworth & Ingersoll, PLC

(57) ABSTRACT

A running-gap control system of an aircraft gas turbine with a core engine including a turbine whose blade rows have a running gap 13 to the turbine casing 12, with the turbine casing 12 being surrounded by a core-engine ventilation compartment 15 enclosed by a fairing 2 of the core engine, with the fairing 2 forming an inner wall of a bypass duct 1. Air from the bypass duct 1 can be introduced via at least one inlet nozzle 5 into a cooling-air distributor 7 by a control system 6, 10, 11 and the air is subsequently returned to the bypass flow 3.

8 Claims, 2 Drawing Sheets

(56) References Cited

U.S. PATENT DOCUMENTS

Figure 1:
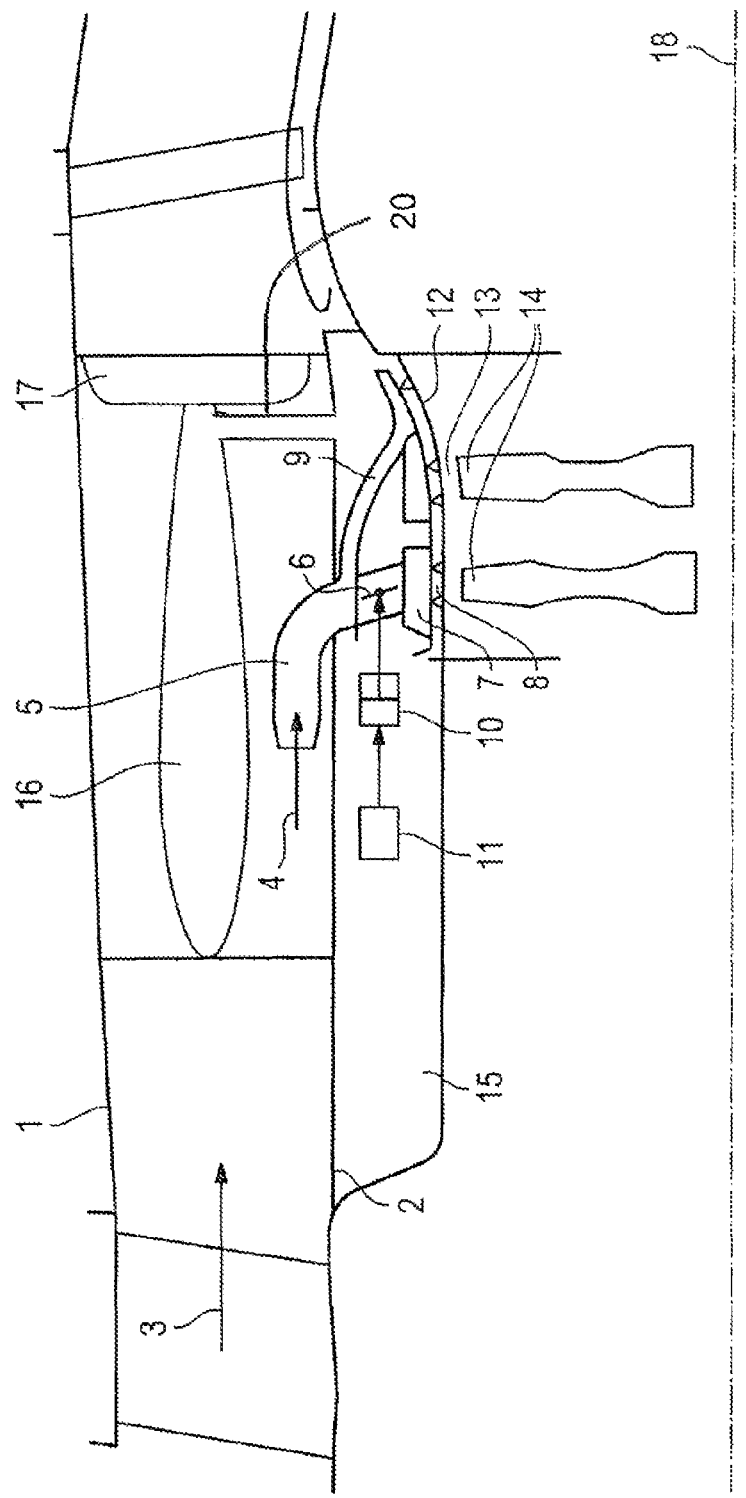

| | | |
|---|---|---|
| 2002/0005038 A1 | 1/2002 | Boeck |
| 2004/0240988 A1 | 12/2004 | Franconi et al. |
| 2008/0080967 A1 | 4/2008 | Urbassik et al. |
| 2008/0131266 A1* | 6/2008 | Vrljes et al. ............... 415/145 |
| 2008/0271433 A1* | 11/2008 | Olver ............................ 60/266 |

FOREIGN PATENT DOCUMENTS

| | | |
|---|---|---|
| DE | 3540943 | 5/1987 |
| DE | 10019437 | 12/2001 |
| DE | 69823590 | 4/2005 |
| DE | 60215602 | 8/2007 |
| DE | 102007044730 | 4/2008 |
| EP | 0288356 | 10/1988 |
| EP | 1148221 | 10/2001 |
| EP | 1923539 | 5/2008 |
| FR | 2867224 | 9/2005 |
| GB | 2164706 | 3/1986 |
| GB | 2302371 | 1/1997 |
| WO | 9211444 | 9/1992 |

OTHER PUBLICATIONS

Eurpoean Search Report dated Jan. 24, 2013 for counterpart Europpean patent application.

* cited by examiner

RUNNING-GAP CONTROL SYSTEM OF AN AIRCRAFT GAS TURBINE

This application claims priority to German Patent Application DE102009010647.2 filed Feb. 26, 2009, the entirety of which is incorporated by reference herein.

This invention relates to a running-gap control system of an aircraft gas turbine with a core engine including a turbine whose blade rows have a running gap to the turbine casing, with the turbine casing being surrounded by a core-engine ventilation compartment enclosed by a fairing of the core engine, with the fairing forming an inner wall of a bypass duct.

For the state of the art, reference is made to US 2007/0140838 A1 and US 2007/0140839 A1.

From the state of the art it is known to use systems for active running-gap control on aircraft gas turbines. These are termed ATCC (Active Tip Clearance Control Systems). Here, the running gap between the linings on the radially inward surface of the turbine casing and the turbine rotor blade tips is influenced by external cooling of the turbine casing. By this, thermal expansion of the turbine casing is accounted for, as well as radial expansion of the turbine rotors and blades.

For these active systems, the state of the art uses air as cooling medium. The airflow is tapped from the engine bypass flow compressed by a fan.

Under almost all operating conditions, these systems have a flow pressure gradient of at least one-half bar relative to the environment. The systems remove air valuable for engine thrust from the engine bypass flow and, after this air has passed the cooling-air distributors, dispose it to the environment of the engine nacelle. This means that the air used for cooling is wasted to the environment. This incurs a not inconsiderable loss of energy and also constitutes a detriment to the environment.

Other systems known from the state of the art remove the cooling air from the compressor. However, this results in an even inferior energy balance of the overall process.

A broad aspect of this invention is to provide a running-gap control system of an aircraft gas turbine of the type specified at the beginning above which, while being simply designed and easily and cost-effectively implementable, is particularly efficient as regards the total energy balance.

According to the present invention, it is therefore provided that air from a bypass flow in the bypass duct is introduced via at least one inlet nozzle into the core engine ventilation compartment by a control system and that the air is subsequently returned to the bypass flow.

The system in accordance with the present invention is characterized by a variety of merits. The essential advantage is that the cooling air is available for engine thrust since it is returned to the bypass flow after having passed the one cooling-air distributor or the several cooling-air distributors. A considerable increase in engine performance is obtained if the air tapped from the bypass flow, for example 0.7 percent on a standard engine, is subsequently used for thrust and not, as in the state of the art, discharged without being used. The running-gap control system according to the present invention is therefore extremely effective for the energy balance of the total process.

According to the present invention, it is particularly favorable if the air is introducible into at least one air distributor arranged adjacent to the casing. Here, it is particularly advantageous if the flow and energy losses of the cooling air thereby incurred are minimized.

Cooling air is preferably routed from the core engine ventilation compartment through at least one aerodynamic fairing of a connecting element between the core engine and the suspension system thereof to an outlet nozzle issuing into the bypass flow. This provides for a particularly effective return of the cooling air.

The control system preferably includes a control valve that can be actuated electrically or by a motor by way of a controller. This enables the cooling air flow to be adjusted in an optimum manner.

Figure 2:
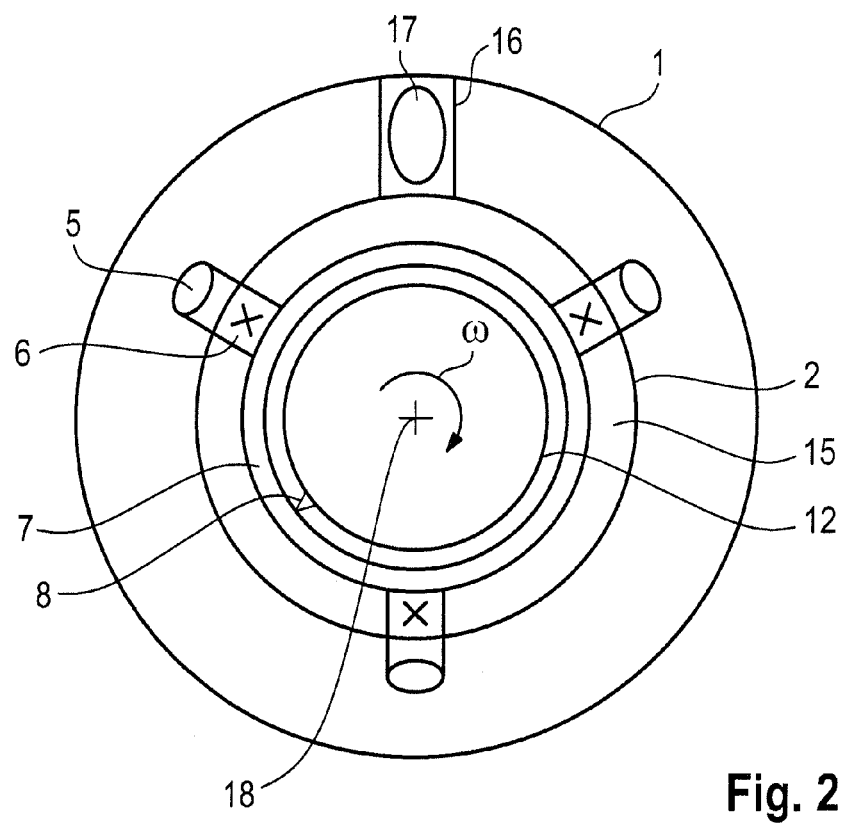
Figure 3:
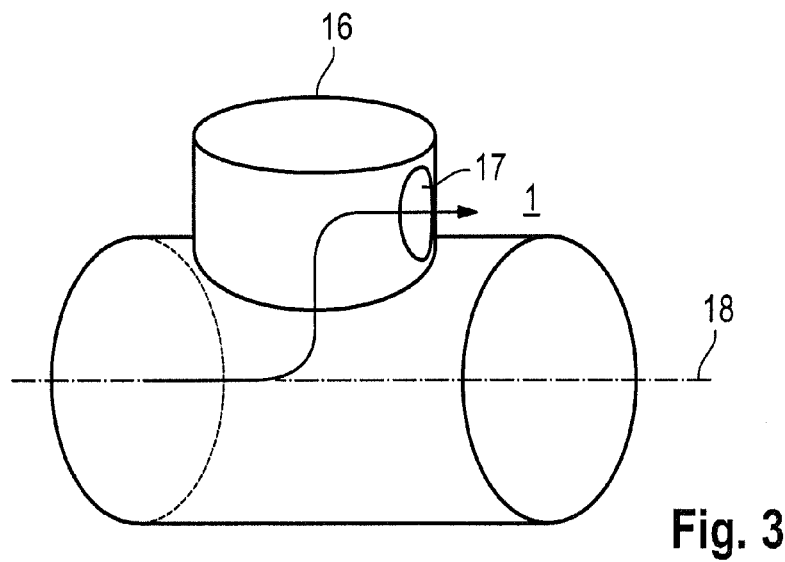

In the following, the present invention is more fully described in light of the accompanying drawings showing a preferred embodiment. In the drawings, FIG. 1 is a schematic partial sectional view in the axial direction of an inventive embodiment of a running-gap control system, FIG. 2 is a radial sectional view as per FIG. 1, and FIG. 3 is a perspective schematic sketch showing the routing of the air into the bypass flow via an exit nozzle.

According to the present invention, a bypass flow 3 passes a bypass duct 1 which is radially inwardly confined by a fairing 2 of a core engine.

Arranged in the bypass duct 1 is at least one aerodynamic fairing 16 whose cross-section is shown tilted by 90° in FIG. 1 and which serves as aerodynamic enclosure of the connections and lines between core engine and nacelle. These designs, except for the outlet opening 17, are state-of-the-art, so that a detailed description is here dispensed with.

Shown in the bypass duct 1 is an inlet nozzle 5 forming an air inlet to the active tip clearance control system. Accordingly, the airflow 4 entering via the inlet nozzle 5 is routed radially inwards towards a branching-off channel of a direct, uncontrolled cooling-air duct 9 and to a control valve 6.

The control valve 6 can be actuated by a motor 10 controllable by a controller 11.

The cooling air subsequently gets into a cooling-air distributor 7 arranged adjacent to the turbine casing 12 so that the cooling air can impinge on the wall of a turbine casing 12 via impingement cooling nozzles or a hole arrangement 8. Provision is thus made for cooling and gap control 13.

Radially inwards, FIG. 1 shows turbine rotor wheel blade tips 14.

The above arrangement, in particular the cooling-air distributor 7, is situated in a core-engine ventilation compartment 15.

From the core-engine ventilation compartment 15, the air flows into the interior of the aerodynamic fairing 16, as schematically shown in FIG. 3, and flows into the bypass duct 1 via an outlet nozzle 17.

The operating pressure gradient of the running-gap control system described is the result of the total pressure at the inlet of the inlet nozzle 5 minus the static pressure at the outlet nozzle 17.

According to the present invention, the air is accordingly removed from the bypass duct 3 via the air inlets 4, 5. The number of these air inlets (inlet nozzle 5 with air inlet 4) is circumferentially variable. Particularly favorable here is an equal circumferential distribution, as shown in FIG. 2.

Alternatively to controlling cooling via the control valve 6, the present invention also provides for a variation of the number of the impingement cooling nozzles 8.

According to the present invention, the cooling-air distributor 7 provides for calming of the flow and circumferentially uniform distribution of the air, so that the latter will uniformly exit from the impingement cooling nozzles 8 and impinge on the turbine casing 12 to be cooled.

The impingement cooling effect provides for high heat transfer values and a large reduction in temperature of the turbine casing 12, thereby minimizing the running gap 13.

In the further course, the air from the impingement cooling nozzles 8 is routed along the casing 12 for convective cooling, then flows into the core-engine ventilation compartment 15 to be delivered from there, as described, into the bypass flow 3 via the cooling-air exit nozzles 17.

According to the present invention, the pressure losses along the individual components of the system according to the present invention can be minimized by appropriate aerodynamic design, enabling the system to operate with a small pressure gradient corresponding to only $\frac{1}{10}$ of a high-pressure system known from the state of the art.

According to the present invention, the cooling flow returned into the bypass flow by an outlet nozzle 17 upstream of an engine nozzle is entirely valuable for the thrust of the aircraft engine. According to the present invention, an optimization of the system for maximum efficiency and an increase in turbine efficiency without the risk of rubbing contact are achievable by suitably controlling the active tip clearance control system via the aircraft engine controller (EEC).

The running-gap control system according to the present invention is controllable or optimizable, respectively, by changing the pressure, or the flow area, or a combination of both.

In the further course, the air from the impingement cooling nozzles 8 is routed along the casing 12 for convective cooling, then flows into the core-engine ventilation compartment 15 to be delivered from there, as described, into the bypass flow 3 via the cooling-air exit nozzles 17. A flow line 20 (schematically shown in FIG. 1) is routed through the aerodynamic fairing 16 to connect the core-engine ventilation compartment 15 with the outlet nozzle 17 to route the bypass air from the core-engine ventilation compartment 15 to the bypass air flow 3 in the bypass duct 1.

LIST OF REFERENCE NUMERALS

1 Bypass duct
2 Fairing of the core engine
3 Flow direction in bypass duct
4 Air inlet to ATCC system
5 Inlet nozzle
6 Control valve
7 Cooling-air distributor
8 Impingement cooling nozzles/hole arrangement
9 Direct, uncontrolled cooling-air duct
10 Motor for valve actuation
11 Controller block (by EEC)/controller
12 Turbine casing
13 Gap (control target)/running gap
14 Turbine rotor wheel blade tips
15 Core-engine ventilation compartment (zone 2)
16 Aerodynamic fairing of the connections to the core engine
17 ATCC cooling-air outlet nozzle in bypass duct/outlet nozzle
18 Machine axis
20 Flow line

What is claimed is:

1. A running-gap control system of an aircraft gas turbine with a core engine, comprising:

a turbine having a turbine casing and at least one blade row having a running gap to the turbine casing;

a core-engine ventilation compartment enclosed by a fairing, the core-engine ventilation compartment surrounding the turbine casing, the fairing forming an inner wall of a bypass duct;

a cooling air distributor positioned around the turbine casing for directing cooling air flow into the core-engine ventilation compartment to the turbine casing to control the running gap;

at least one scoop type inlet nozzle projecting into and open to the bypass duct for directing bypass air from the bypass duct into the cooling air distributor, an inlet opening of the scoop type inlet separated from the fairing forming the inner wall of the bypass duct, all cooling air supplied to the cooling air distributor being supplied from the bypass duct;

a control system for controlling an amount of bypass air from the bypass duct into the cooling air distributor;

an outlet nozzle positioned in the bypass duct upstream of an engine nozzle to output the bypass air from the core-engine ventilation compartment beck into the bypass flow in the bypass duct in a direction of the bypass flow to provide thrust to the bypass flow, the system having an aerodynamic design between the inlet nozzle and the outlet nozzle to reduce pressure losses therebetween to permit the outlet nozzle to output the bypass air from the core-engine ventilation compartment back into the bypass flow in the bypass duct upstream of the engine nozzle; and a flow line connecting the core-engine ventilation compartment with the outlet nozzle to route the bypass air from the core-engine ventilation compartment to the outlet nozzle; the flow line being routed through at least one aerodynamic fairing positioned in the bypass duct.

2. The system of claim 1, and further comprising a nozzle arrangement positioned between the cooling air distributor and the turbine casing for directing air from the cooling air distributor to the turbine casing.

3. The system of claim 2, wherein the control system includes at least one control valve, a motor connected to the control valve for actuating the control valve and a controller for controlling the motor.

4. The system of claim 3, and further comprising a plurality of cooling-air distributors spaced apart along an axial direction of the turbine casing.

5. The system of claim 2, and further comprising a plurality of cooling-air distributors spaced apart along an axial direction of the turbine casing.

6. The system of claim 1, wherein the control system includes at least one control valve, a motor connected to the control valve for actuating the control valve and a controller for controlling the motor.

7. The system of claim 6, and further comprising a plurality of cooling-air distributors spaced apart along an axial direction of the turbine casing.

8. The system of claim 1, and further comprising a plurality of cooling-air distributors spaced apart along an axial direction of the turbine casing.

* * * * *